United States Patent
Johann et al.

(10) Patent No.: US 12,275,657 B2
(45) Date of Patent: Apr. 15, 2025

(54) FILTER CANDLE AND SYSTEM COMPRISING A FILTER CANDLE FOR PREPARING WATER

(71) Applicant: BWT Holding GmbH, Mondsee (AT)

(72) Inventors: Jürgen Johann, Mondsee (AT); Michael Hofbauer, Salzburg (AT); Hannes Hittenberger, Tiefgraben (AT)

(73) Assignee: BWT Holding GmbH, Mondsee (AT)

( * ) Notice: Subject to any disclaimer, the term of this patent is extended or adjusted under 35 U.S.C. 154(b) by 456 days.

(21) Appl. No.: 17/781,576

(22) PCT Filed: Dec. 3, 2020

(86) PCT No.: PCT/EP2020/084413
§ 371 (c)(1),
(2) Date: Jun. 1, 2022

(87) PCT Pub. No.: WO2021/110808
PCT Pub. Date: Jun. 10, 2021

(65) Prior Publication Data
US 2023/0144794 A1    May 11, 2023

(30) Foreign Application Priority Data
Dec. 5, 2019 (DE) .................... 10 2019 133 211.7

(51) Int. Cl.
*C02F 1/42* (2023.01)
*C02F 1/00* (2023.01)
*C02F 1/28* (2023.01)

(52) U.S. Cl.
CPC ............. *C02F 1/42* (2013.01); *C02F 1/008* (2013.01); *C02F 1/283* (2013.01); *C02F 2201/006* (2013.01); *C02F 2301/043* (2013.01)

(58) Field of Classification Search
None
See application file for complete search history.

(56) References Cited

U.S. PATENT DOCUMENTS

| | | |
|---|---|---|
| 2003/0196948 A1 | 10/2003 | Bassett et al. |
| 2005/0161394 A1* | 7/2005 | Fritze .................... B01D 27/08 210/232 |
| 2007/0215531 A1* | 9/2007 | Wawrla ................. F16K 11/074 210/101 |
| 2008/0087597 A1 | 4/2008 | Johann et al. |
| 2018/0009680 A1 | 1/2018 | Walter et al. |
| 2020/0199001 A1 | 6/2020 | Bursztein et al. |
| 2021/0047207 A1 | 2/2021 | Johann et al. |

FOREIGN PATENT DOCUMENTS

| | | |
|---|---|---|
| DE | 102006049084 A1 | 4/2008 |
| DE | 202009001946 U1 | 7/2010 |
| DE | 102015102011 A1 | 8/2016 |
| DE | 102018107596 A1 | 10/2019 |
| WO | 2019038621 A1 | 2/2019 |

* cited by examiner

*Primary Examiner* — Richard C Gurtowski
(74) *Attorney, Agent, or Firm* — Smartpat PLC

(57) ABSTRACT

A filter candle for treating water is provided, which is adapted to be connected to a filter head. The filter candle comprises a housing which is filled with an ion exchange material for softening the water to be treated. The filter candle has a head with one inlet and at least two outlets, and water that can be introduced into the filter head at a first outlet is more softened than water which can be introduced into the filter head at a second outlet.

19 Claims, 10 Drawing Sheets

FILTER CANDLE AND SYSTEM COMPRISING A FILTER CANDLE FOR PREPARING WATER

TECHNICAL FIELD

The disclosure relates to a filter head and to a filter candle for treating water, which is filled with an ion exchange material.

The disclosure furthermore relates to a system for water treatment which comprises a filter candle with a filter candle head. The disclosure also relates to a filter head for a filter candle.

BACKGROUND

Water treatment systems which comprise a filter candle are known from practice. More particularly, BWT AG is marketing a water treatment system under the brand name "Bestmax®". The system comprises a filter head which can be connected to an on-site water pipe.

A filter candle filled with an ion exchange material is connected to the filter head by a screw connection, and subsequently water is passed through the filter candle and is thereby softened.

In addition to softening, such filter candles can also be used to clean the water and may, for example, include activated carbon to remove germs.

The so treated water is in particular used in households and gastronomy for operating coffee machines and vending machines for producing hot and/or cold beverages.

Also, softer water can improve the taste of coffee.

The system described above can comprise a filter candle with a bypass, in which only part of the water is passed through the ion exchange material. The desired degree of softening can be set via an adjustable bypass flow which is not passed through the ion exchange material. In this way, the system can in particular be adapted to the water hardness which differs depending on the location.

For preparing beverages, the degree of hardness is in particular set between soft and medium hard. On the other hand, nearly completely softened water, in particular a total hardness of less than 0.5° dH, is undesirable. In particular the salts are extracted from the water in the case of such a strong softening, so that it would be less suitable for drinking, like fully demineralized water.

While soft to medium hard water is optimal for preparing hot beverages, it is optimal to use water as soft as possible for other kitchen appliances such as steam cookers, for example, in particular almost completely demineralised water, in order to prevent salt and limescale deposits.

In theory it would be possible to make a respective adjustment via the bypass, depending on which water is required, for example to close the bypass completely when water for a steam cooker is needed.

However, this is inconvenient, in particular as filter candles are often installed under the sink.

Furthermore, each time the change is made, the water in the line downstream of the filter candle would first have to be drained before water with the changed degree of hardness emerges.

SUMMARY

An object of the disclosure is to at least mitigate the stated drawbacks of the prior art.

More particularly, it is an object of the disclosure to provide a filter candle and a system for water treatment, which allows in a simple way to provide and extract water with at least two different degrees of hardness.

According to a further aspect, it is an object of the disclosure to provide a filter head that can be connected easily and conveniently.

The object is achieved by a filter candle for the treatment of water, by a system for the treatment of water, which comprises a filter candle, and by a filter head adapted for such a system according to any one of the independent claims.

Preferred embodiments and refinements will be apparent from the subject-matter of the dependent claims, the description and the figures.

The disclosure relates to a filter candle for treating water, which is adapted for being connected to a filter head.

More particularly, the disclosure relates to a filter candle comprising a connection head which has a thread, for example, for being coupled to the filter head.

The filter head is configured for on-site connection to the water pipe.

This makes it possible to easily remove the filter candle and to replace it by a new filter candle once the ion exchange material has been used up.

The filter candle comprises a housing which is filled with an ion exchange material for softening the water to be treated.

The ion exchange material may be an ion exchange resin in granular form, for example. It is loaded with hydrogen, for example, which is replaced by alkali and alkaline earth ions in the water.

The filter candle has a head with one inlet and at least two outlets.

The water to be treated is fed into the filter candle via the inlet.

When water is extracted from a consumption point, the treated water can be discharged via the outlets.

Water that is almost completely softened can be introduced into the filter head at a first output of the filter candle, and water that has been subjected to a different treatment step, e.g. using activated carbon, can be introduced into the filter head at a second output of the filter candle.

Thus, the filter candle has two outlets, and the water is treated differently inside the filter candle so as to provide a respective different degree of hardness at the two outlets.

The filter candle is therefore configured such that water can be extracted for use at both outlets. Hence, the inlet water is treated via both filter pathways. The inlet water is softened when being directed through at least one filter pathway. When being passed through the other filter pathway, the inlet water is either softened less than when being passed through the other filter pathway, or it is not softened at all, but merely subjected to a different water treatment.

According to one embodiment, this is implemented by having a bypass provided in the filter candle, which allows to mix water that has passed through the ion exchange material with water that was not passed through the ion exchange material or was passed through the ion exchange material with a shorter dwell time or over a shorter distance.

It is in particular contemplated that the water which can be discharged at the second outlet was mixed with the water leaving the bypass.

This bypass can preferably be adjusted by means of a control element, so that the degree of hardness of the water discharged at the second bypass can be adjusted.

The water leaving the first outlet, on the other hand, has preferably not been mixed with water from the bypass. Thus, water that can be provided at the first outlet, has been softened as much as possible by the filter candle, depending on the configuration thereof, and, similar to fully desalinated water, in particular contains so few salts and minerals that the formation of deposits in devices in which the water is evaporated, such as for instance a steam cooker, is largely avoided. The filter candle is in particular designed such that when used as intended, the hardness will be below 1° dH, preferably below 0.5° dH.

In one embodiment, the inlet and the second outlet are arranged coaxially at the head of the filter candle. However, it is also possible for the inlet and the second outlet to be arranged on one side of the filter candle on the same head.

According to one embodiment, the first outlet (with the water softened to the maximum possible degree) is arranged so as to be turnable on top of the filter head.

More particularly, the first outlet is in the form of a coaxial tube emerging from the top of the filter head, which is then angled to the side.

The tube is preferably turnable through at least 180°, most preferably through 360° about the central axis of the filter head.

In this way, the first outlet can easily be turned in the direction of the tapping point.

According to one embodiment it is suggested to provide a central inlet or outlet located along a central axis of the filter candle, which is surrounded by two coaxial annular passages through which water can either be introduced or discharged.

In particular it is contemplated that the inlet is arranged between the first and the second outlet.

For example, the first outlet may be in the form of a central tube, radially adjoined by the inlet in the form of an annular passage, and the inlet in turn adjoined by the second outlet in the form of a further annular passage.

It has been found that in this way both the filter candle and the filter head can be designed to be particularly compact.

In one embodiment, the filter candle includes a mixing chamber in which the water that passed through the ion exchange material is mixed with the bypass flow.

The mixing chamber is therefore intended for providing the water for the second outlet.

According to one embodiment, a backflow preventer is arranged between the ion exchange material provided inside the filter candle and the mixing chamber.

The backflow preventer prevents bypass water from entering the water flow leading to the first outlet.

In this way it is ensured that only water that has been completely passed through the ion exchange material will reach the first outlet.

The backflow preventer may extend around a centrally arranged tube, in particular a downcomer, in particular in the form of a ring.

It is furthermore also possible to have a plurality of backflow preventers distributed around the centrally arranged tube.

For example, the backflow preventer can be plate-shaped and may comprise at least one cover which can only be opened by water that flows in one direction and is thus effective as a backflow preventer.

To this end, the at least one cover can be mounted resiliently and/or can be made of resilient material.

At least one filter layer is preferably arranged between the backflow preventer and the ion exchange material, which retains the ion exchange material.

The bypass water preferably passes through a filter layer.

It is in particular contemplated that the water from the aforementioned mixing chamber is passed through a filter layer. This filter layer may in particular include materials for removing germs and contaminants. More particularly, the filter layer may include activated carbon.

The provisioning of the bypass inside the filter candle has the advantage that in this way it is possible for the water directed through the bypass to also pass through a filter layer of the filter candle. This would not be possible if the bypass was provided through the filter head.

The dislosure also relates to a system for treating water, which comprises a filter candle.

More particularly, the disclosure relates to a system comprising a filter candle as described above.

The system comprises a filter head in which the filter candle is installed.

As stated above, the filter candle is filled with an ion exchange material.

The filter head has one inlet and at least two outlets.

The system is designed such that the water that can be extracted from a first outlet is softened to a greater extent than the water that can be extracted from a second outlet.

It is thus contemplated to divide the water directed through the filter candle into two partial flows, which will lead to two differently softened types of water due to a different dwell time in the ion exchange material and/or due to a different treatment.

The water provided at the second outlet is preferably produced using a bypass which serves to mix softened water with bypass water.

As described above, the bypass can be provided inside the filter candle.

According to another embodiment, the bypass may also be arranged in the filter head.

This embodiment has the advantage that the configuration of the filter candle can be simplified in this way. More particularly, the filter candle will require only one inlet and one outlet in this case.

However, a drawback of this embodiment is that the water directed through the bypass cannot be treated by the media provided inside the filter candle.

For the aforementioned first embodiment, the filter head may have a control element which is operable to actuate an actuator which engages in the filter candle and through which the flow ratio between the main flow and the bypass flow can be adjusted.

It is in particular contemplated to provide an actuator which can be displaced axially by means of a rotary control element and which is thus operable to open and close one or more openings of a passage of the filter candle so as to regulate the strength of the bypass flow.

The disclosure also relates to a filter head which is adapted for the system described above and which accordingly comprises one inlet and two outlets.

Otherwise, the filter head may comprise all the features described above in conjunction with the filter head.

In particular, the filter head may comprise a control element for setting the flow ratio between a main flow and a bypass flow, the control element extending around an outlet that extends centrally through and out of the control element.

According to this embodiment it is therefore contemplated that one outlet, in particular the first outlet through which water can be discharged that has not been mixed with water of the bypass flow is arranged centrally and preferably so as to be turnable with respect to the other connections.

In order to make the filter head compact and simple, this outlet extends out of the top of the filter head and is surrounded by the control element which may in particular be in the form of a rotary ring.

In a further embodiment, a bypass is provided inside the filter head. The bypass serves to mix water that is flowing out of the filter candle with inlet water.

This water, which will be less softened as a result, is fed to the second outlet, while water to which relatively little or no inlet water was added is fed to the first outlet.

In this embodiment, a filter candle with two outlets can be dispensed with. On the other hand, the water flowing through the bypass will not be treated at all. Therefore, this embodiment is particularly suitable for areas where the inlet water is already impeccable for human consumption.

A further aspect relates to a filter head.

More particularly, the disclosure relates to a filter head that has one or more of the features described above.

The filter head can, but does not need to have two outlets. Rather, the filter head may also have only one outlet.

The filter head is adapted for installing a filter candle therein, which has at least one inlet and at least one outlet, in particular by being screwed in.

The filter head comprises an outlet that is arranged coaxially to a central axis and is adapted to be turnable.

The central axis is in particular defined by the central axis of a thread for screwing in the filter candle.

The outlet is in particular in the form of an angled turnable tube. In this way, the outlet can easily be turned in the direction of the tapping point.

In one embodiment, a control element for a bypass extends around the outlet.

Hence, an outlet passage extends through the control element.

The control element may in particular be adapted so as to be turnable for setting a degree of softening.

The invention permits to provide a filter head with a compact design that can be connected easily and conveniently.

BRIEF DESCRIPTION OF THE DRAWINGS

The subject-matter of the invention will now be explained in more detail by way of an exemplary embodiment with reference to the drawings of FIGS. 1 through 13.

DETAILED DESCRIPTION

Figure 1:
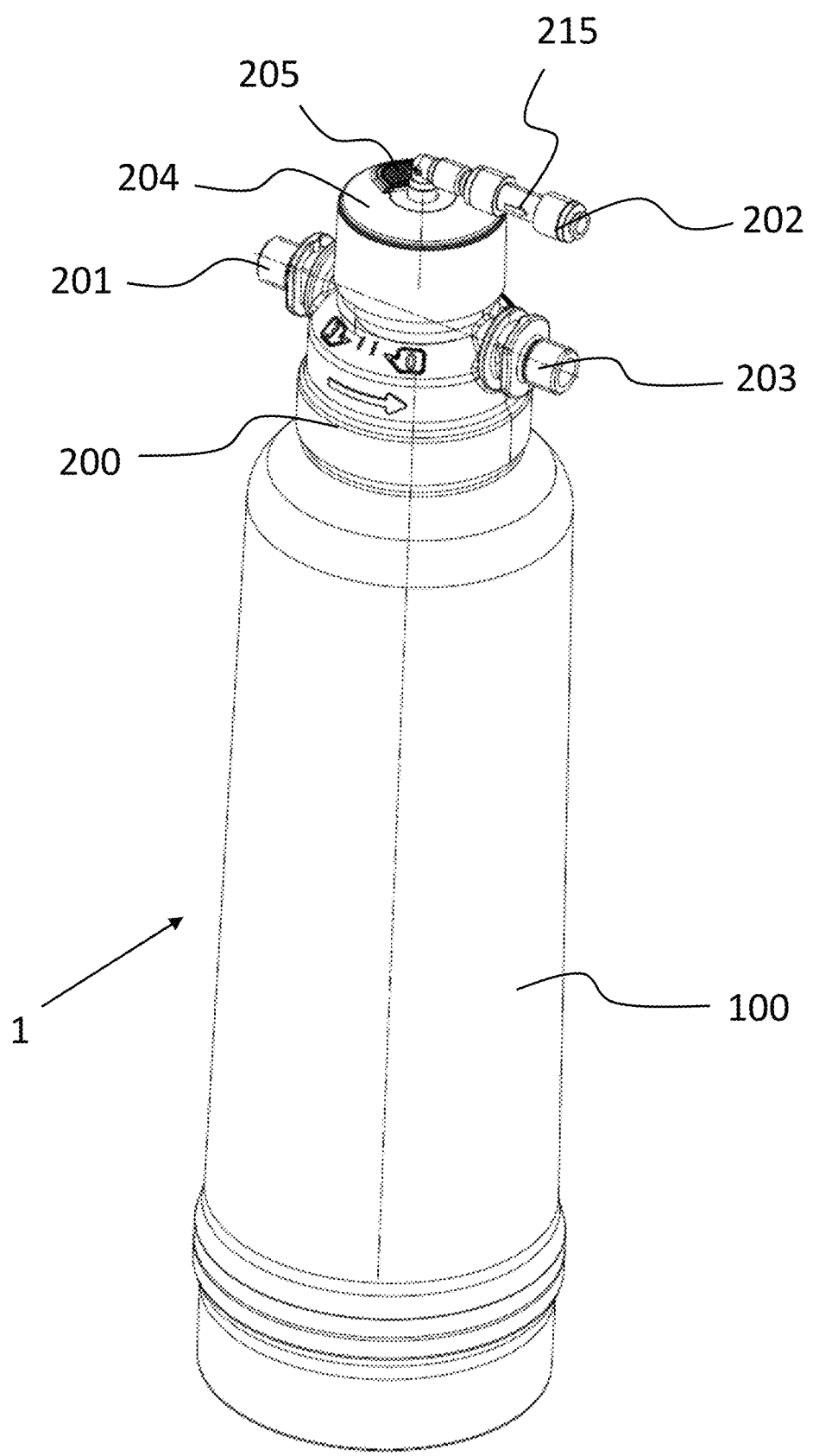
FIG. 1 shows an exemplary embodiment of a system for treating water, which comprises a filter candle connected to a filter head.

FIG. 1 shows a perspective view of a system 1 for water treatment.

System 1 comprises a filter candle 100 that is installed in a filter head 200.

Filter head 200 is used for on-site connection of the system 1 and has one inlet 201 for being connected to an on-site water pipe and two outlets 202, 203 from which water can be extracted.

In this view, the outlets 202, 203 are arranged on the side opposite to the inlet 201, and outlet 202 is turnable by 360° so that it can be aligned in the direction of the tapping point.

Outlet 202 extends out of the top of the filter head 200 and is then angled. In this exemplary embodiment, the first outlet 202 is used to extract water which is softened to the maximum degree possible with the filter candle 100 and can be used like fully desalinated water, in particular for steam-generating devices such as steam cookers.

The second outlet 203 allows to extract partially softened water which can in particular be used for the preparation of beverages.

For example, the second outlet 203 can be connected to a machine for preparing hot beverages, such as a fully automatic coffee machine.

So it is possible to either extract softened water at the first outlet 202 or partially softened water at the second outlet 203, or even to extract water at both outlets 202, 203 simultaneously.

The desired degree of hardness of the water dispensed at outlet 203 can be adjusted by means of a control element 204.

Control element 204 is enabled by pressing the locking member 205 and can then be rotated to set the desired degree of hardness.

In this way, the softening is in particular adapted to the degree of hardness of the water at the respective location. Normally, the setting will then not be changed anymore.

A backflow preventer 215 arranged in the line of the first outlet 202 prevents softened water from being able to flow back. The second outlet also includes a backflow preventer (see FIG. 7, 211).

Figure 2:
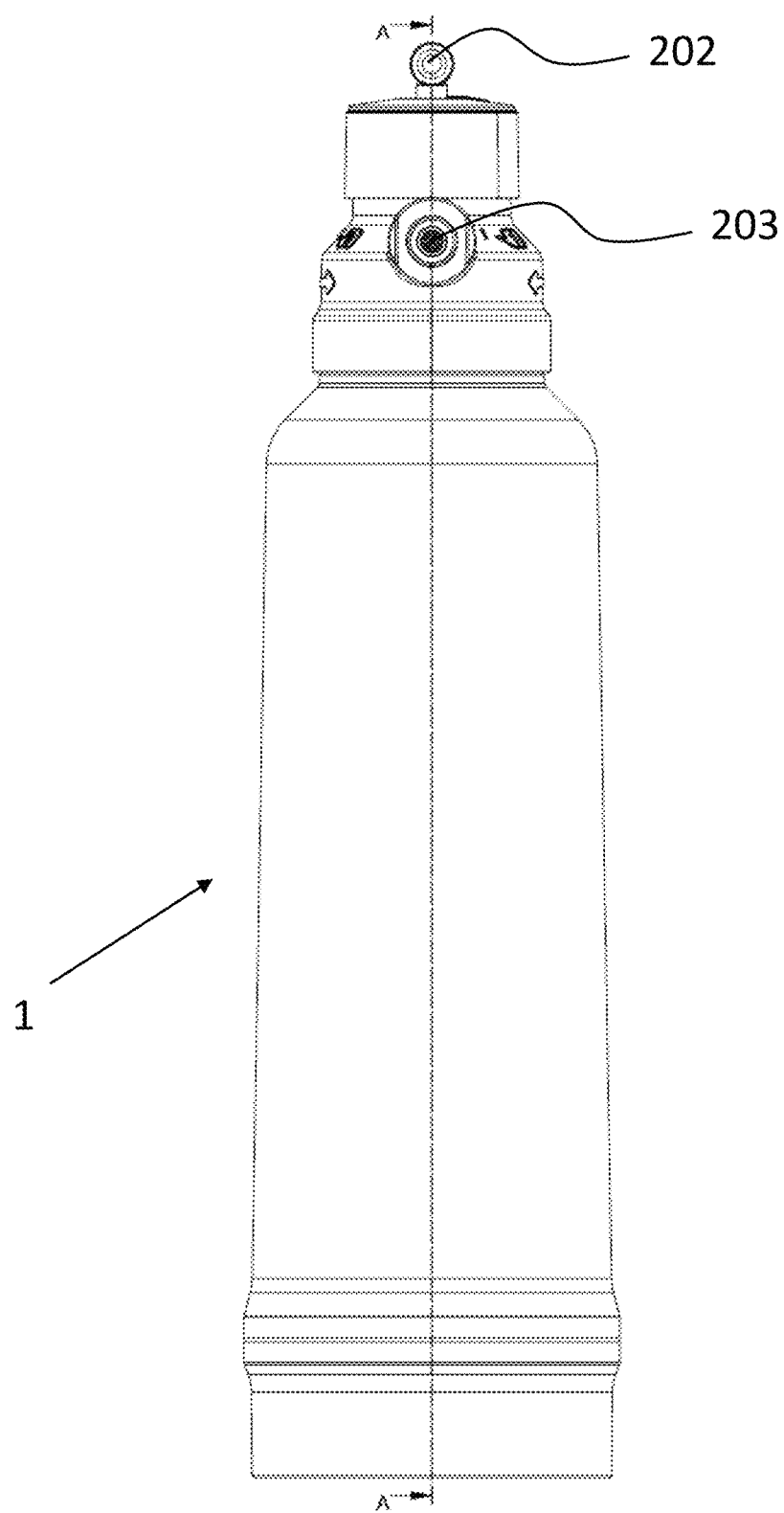
FIG. 2 shows the system in a side elevational view.

FIG. 2 is a side elevational view of the system 1 looking at the outlets 202 and 203 (from the front).

Figure 3:
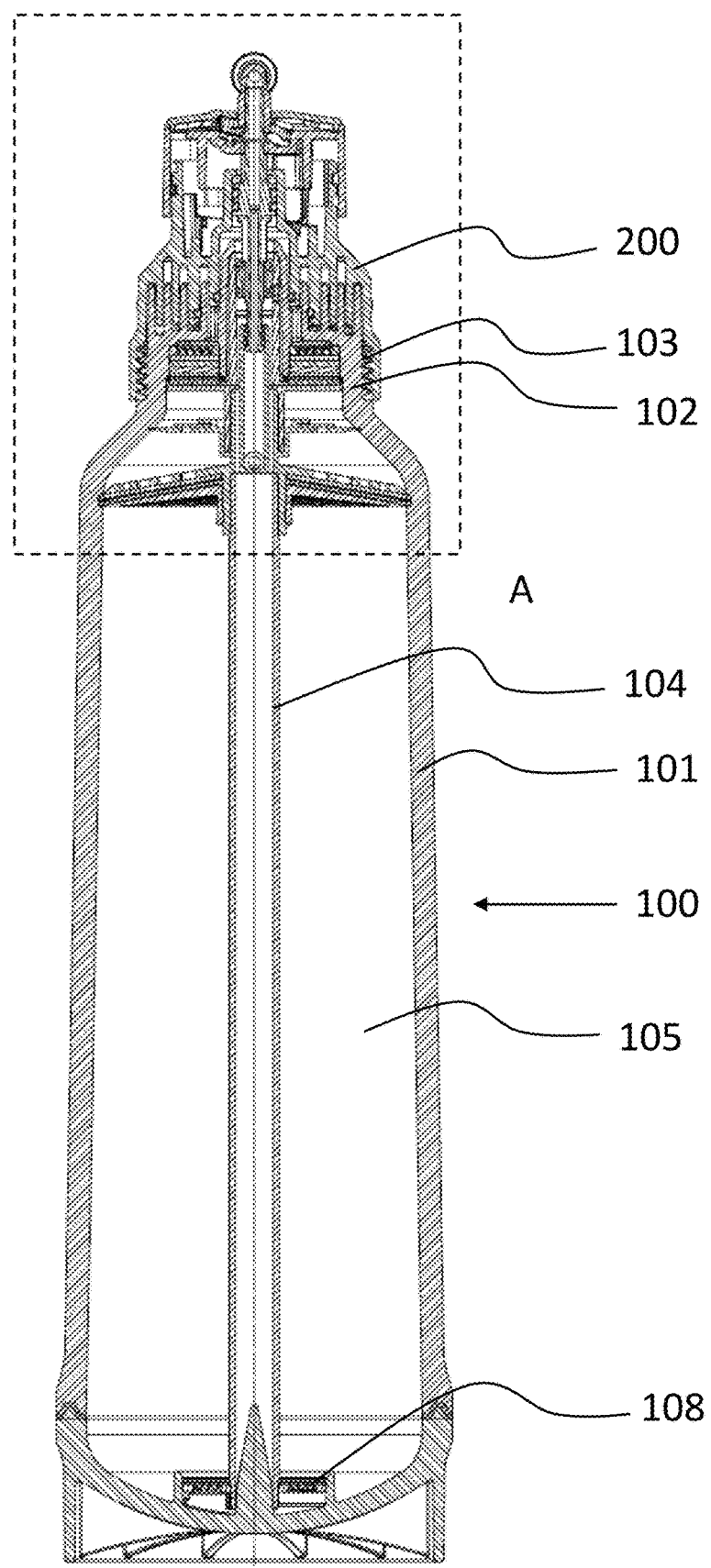
FIG. 3 is a sectional view taken along line A-A as indicated in FIG. 2.

FIG. 3 is a sectional view taken along line A-A as indicated in FIG. 2.

Filter candle 100 comprises a housing 101. The head 102 of filter candle 100 has a thread 103 through which the filter candle is coupled to the filter head 200.

The housing defines an interior 105 which is at least partially filled with a softening material, in particular with a weakly acidic ion exchange resin (not shown).

Water to be treated is directed from the filter head 200 into the housing 101 via a downcomer 104 and enters the interior 105 at the bottom of the housing through a lower inlet 108 which may include a filter layer.

The water then passes through the ion exchange material and is discharged as will be discussed in more detail below.

Figure 4:
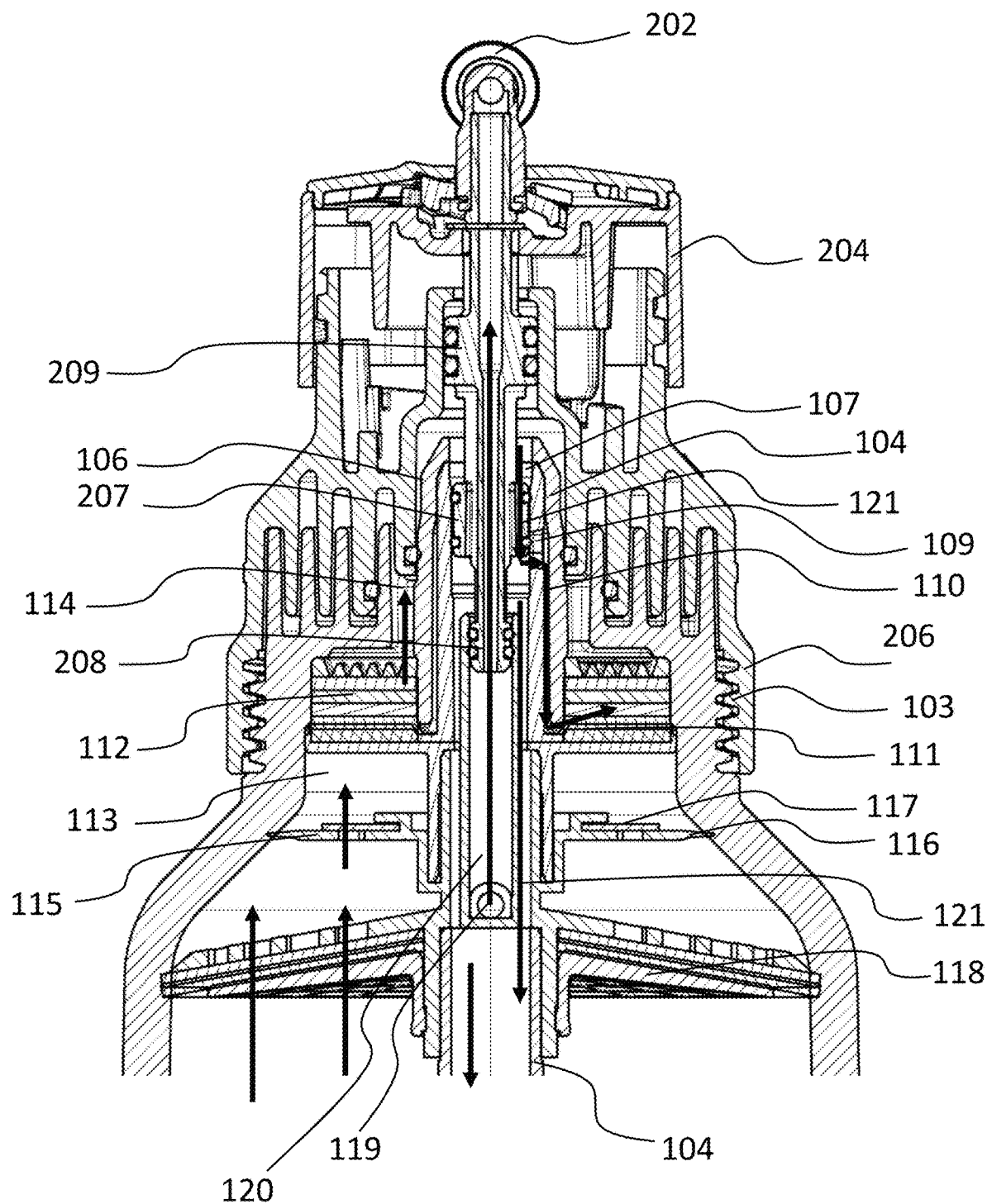
FIG. 4 is a detailed view of section A as indicated in FIG. 3.

FIG. 4 is a detailed view of section A as indicated in FIG. 3, that is the area of the head 102 of filter candle 100 and of the filter head 200.

Thread 103 of filter candle 100 is screwed into the thread 206 of filter head 200.

Filter candle 100 has an inlet 107 through which water to be treated is introduced into the filter candle 100.

The flow of inlet water is indicated by arrows on the right and the flow of the outlet water is indicated by arrows on the left.

The inlet 107 is defined by downcomer 104 through which water flows from the filter head 200 into the filter candle 100.

The central passage 120 serves to discharge the water to the outlet 202.

The inlet water is introduced into the downcomer 104 via passage 121 which is in the form of an annular passage, from where it is directed downwards and thus passes through the ion exchange material.

The central passage 120 which is defined by a tube 106 inside the filter candle 100 is arranged inside the downcomer 104. Between tube 106 and downcomer 104 there is an annular passage through which water can flow downwards.

Filter candle 100 comprises a bypass in the form of at least one opening 109 in the downcomer 104.

Part of the water can exit from the downcomer 104 laterally, through opening 109, and is directed through passage 110 and into a mixing chamber 113 which is partially filled with at least one filter layer 112.

The bypass 109 can be adjusted by actuating control element 204 to axially displace the actuator 207 through a threaded spindle.

The passage 120 which leads to the second outlet 202 also extends through the actuator 207.

Moving the actuator 207 up and down, respectively, will change the open cross section of the opening 109 so that an adjustable bypass is provided in this way.

It will be appreciated that there may also be a plurality of openings provided instead of a single opening 109, which are opened or closed one after the other.

From opening 109, the bypass water flows through annular passage 110 and the bypass flow exits via passage outlet 111 and mixes with the water rising from the filter candle 100.

The water flow from inlet 201 is directed via inlet 107 through downcomer 104 and into the interior 105, where it rises again and passes through the ion exchange material.

In mixing chamber 113, the rising water mixes with the bypass water.

Via passage 114 which leads to the second outlet 203 of filter head 200, the water is discharged. Passage 114 is in the form of an annular passage and extends around the downcomer 104.

The filter candle 100 thus has an inlet 107 which leads into an annular passage between tube 106 and downcomer 104, and has an outlet also in the form of an annular passage 114, which extends around the downcomer 104 and which leads to the second outlet 203 of the filter head 200 in the connected state.

The central axial passage 120 defines the outlet of filter candle 100 and leads to the first outlet 202 of the filter head 200.

The water flowing through passage 120 is not mixed with the bypass flow, but rather enters the passage 120 via inlet 119 after having passed through the ion exchange material.

In order to prevent bypass water from flowing to the passage 120, a backflow preventer 115 is arranged between the mixing chamber 113 and the inlet 119.

In this exemplary embodiment, the backflow preventer 115 is in the form of an annular plate 116 that extends across the housing.

Plate 116 is provided with one or more resilient covers 117.

More particularly, a single annular cover 117 can be used, or else a plurality of covers 117 distributed circumferentially so as to close the openings of plate 116.

The one or more covers 117 are flexible and/or are resiliently mounted so as to be able to be deflected by water flowing into the mixing chamber 113.

However, when water is extracted at the first outlet 202, the one or more covers 117 will sit on the plate 116, thereby preventing water from the mixing chamber 113 and thus bypass water from entering the inlet 119.

In this exemplary embodiment, at least one filter layer 118 is arranged between backflow preventer 115 and the ion exchange material. This filter layer holds back the granulated ion exchange material.

Figure 5:
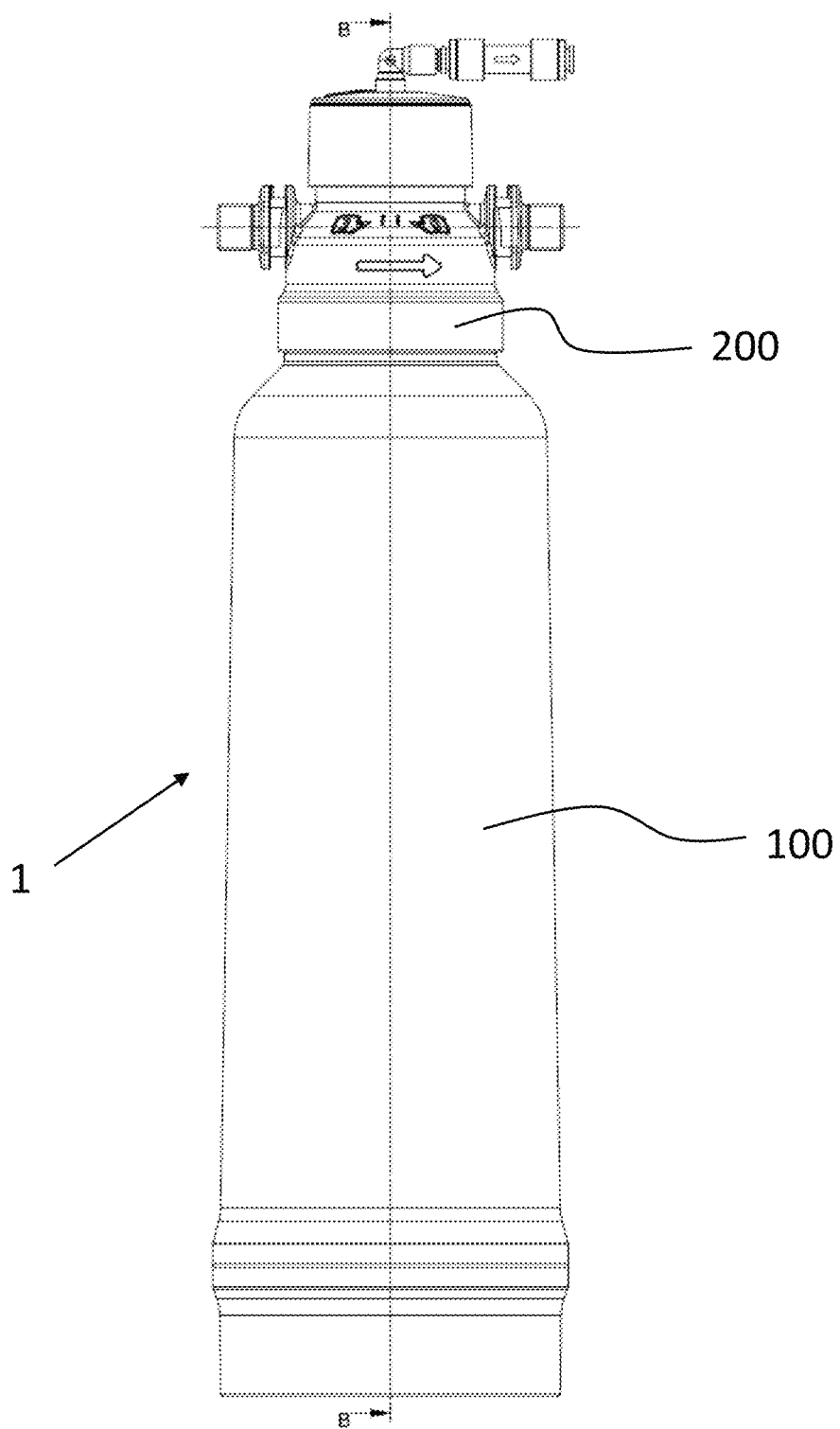
FIG. 5 shows another side elevational view of the system.

FIG. 5 is another side elevational view of the water treatment system 1 consisting of filter candle 100 and filter head 200.

Figure 6:
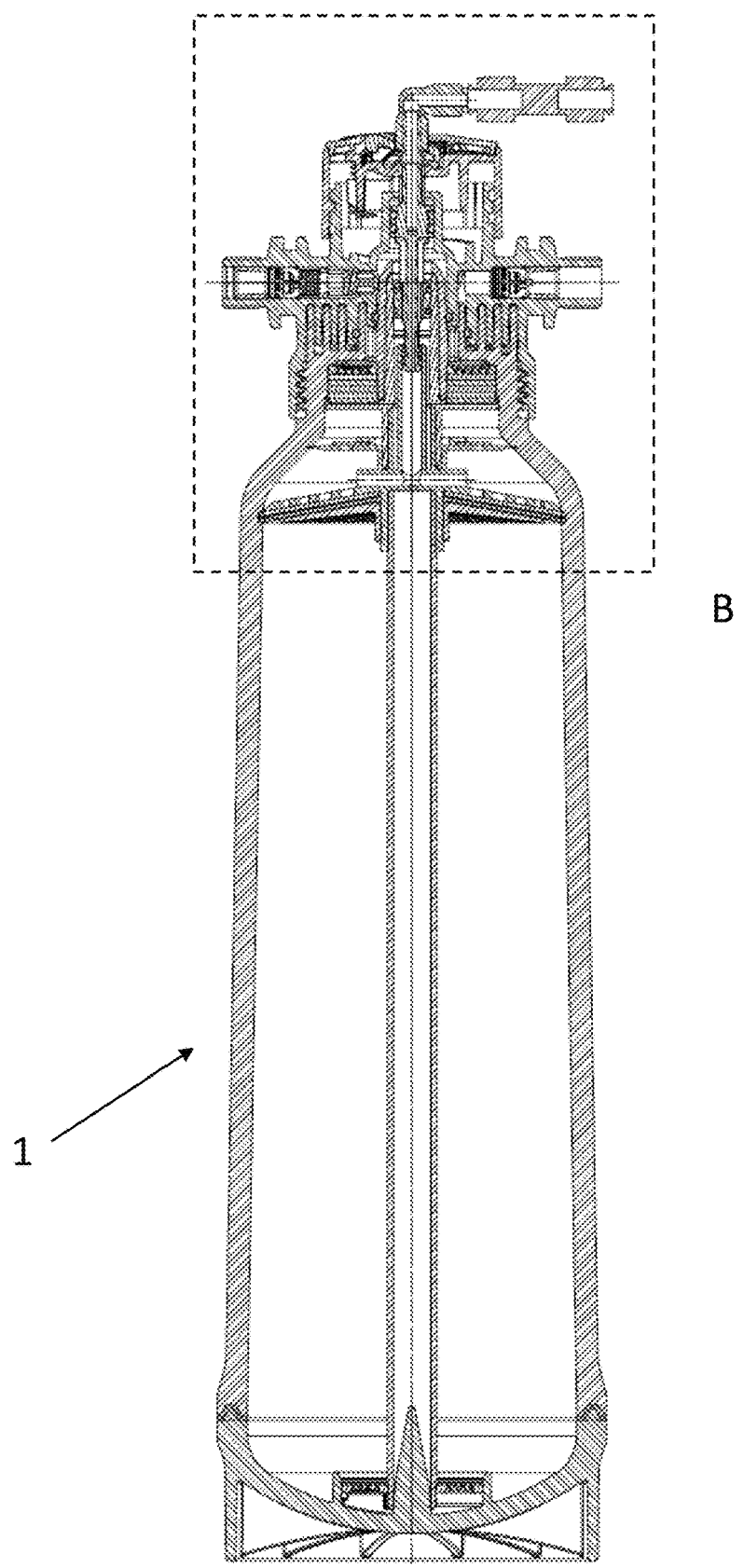
FIG. 6 is a sectional view taken along line B-B as indicated in FIG. 5.

FIG. 6 is a sectional view taken along line B-B as indicated in FIG. 5.

Figure 7:
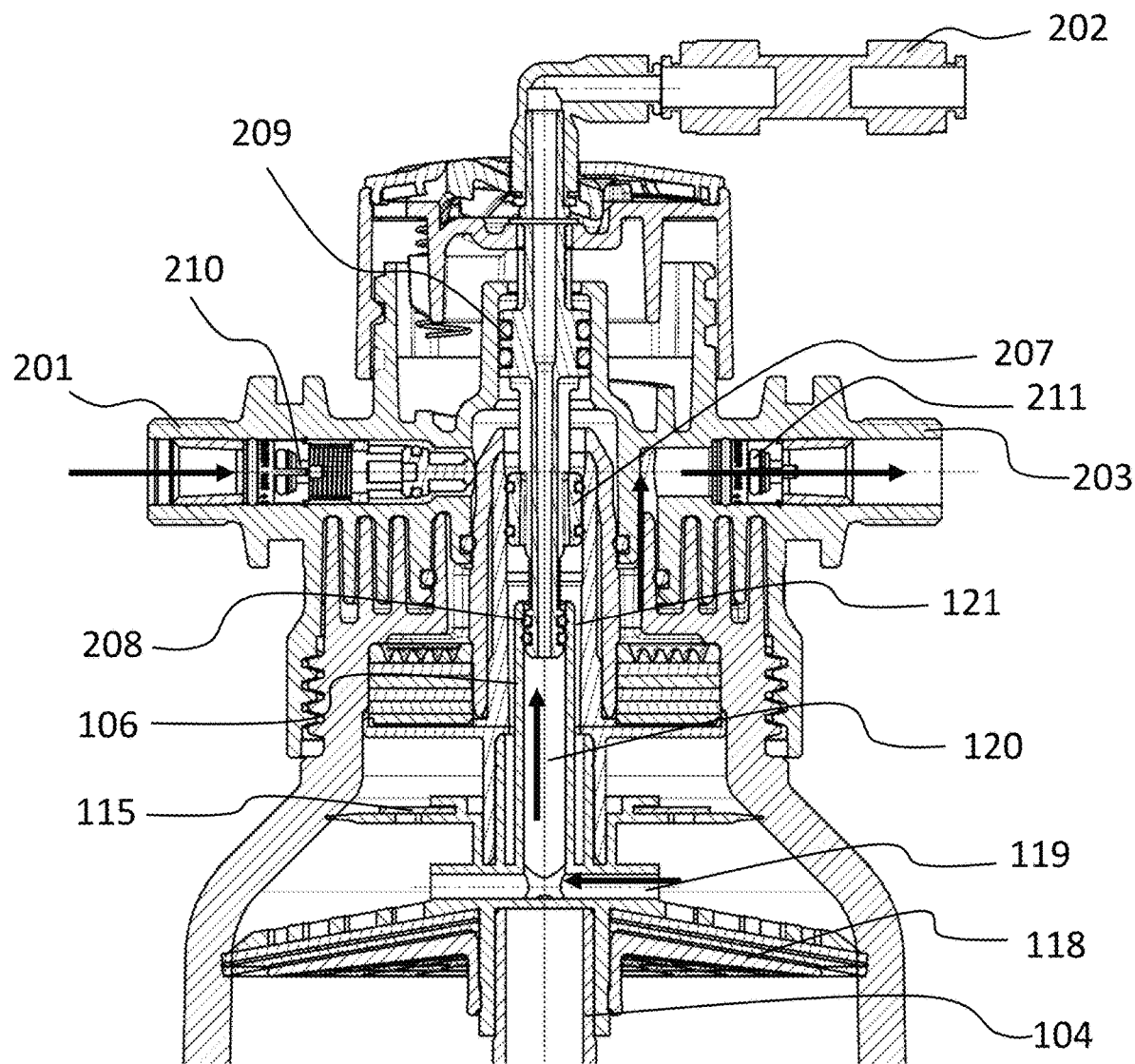
FIG. 7 is a detailed view of section B as indicated in FIG. 6.

FIG. 7 is a detailed view of section B as indicated in FIG. 6.

In this view, the section is taken along the tubes which define the inlet 201 and the two outlets 202, 203.

One backflow preventer 210 is arranged downstream of inlet 201.

Another backflow preventer 211 is arranged upstream of outlet 203.

In this view it can be seen that below the backflow preventer 115 of the filter candle water can flow into the passage 120 via inlet 119, and this water will then reach the outlet 202 through passage 120 which extends through seal 208 and actuator 207.

In the coupled state, seal 208 engages in tube 106 and thus connects the central outlet of filter candle 100 with the outlet 202 of filter head 200.

As described above, this water is not mixed with bypass water and can therefore in particular be used for steam generating devices.

The inflowing water, on the other hand, flows through annular passage 121 along downcomer 104. This annular passage 121 extends as far as to the inlet 119 into passage 120, which extends laterally out of downcomer 104. Only the downcomer 104 extends further downward.

Seal 209, through which the passage 120 extends as well, seals off the inlet 107 to the outside.

Figure 8:
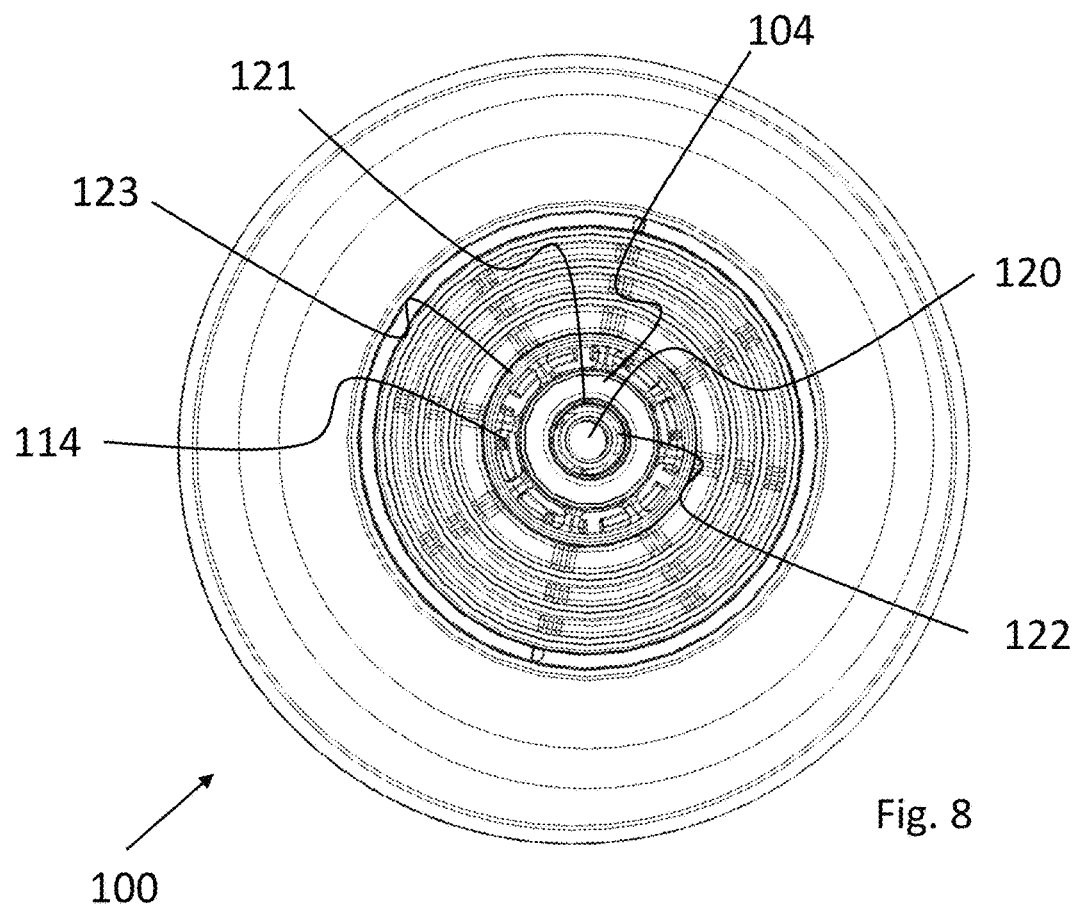
FIG. 8 is a top plan view of the filter candle.

FIG. 8 is a top plan view of the filter candle 100.

Passage 120 is located in the center and is defined by tube 122 inside the filter candle 100 and defines the first outlet of the filter candle 100.

Figure 9:
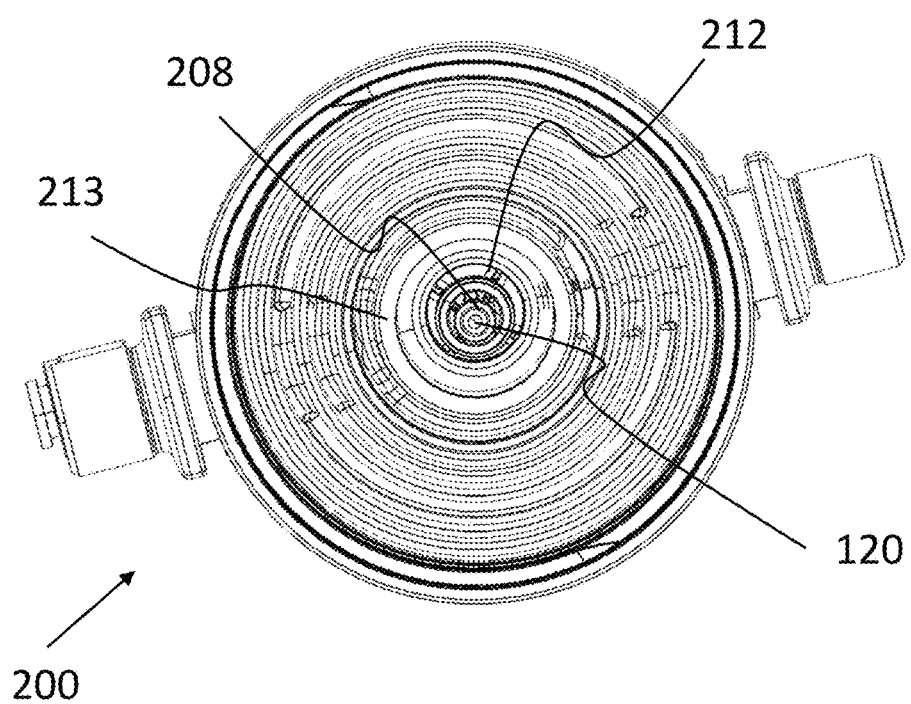
FIG. 9 is a bottom plan view of the filter head.

In the connected state, the tube 122 engages around seal 208 which can be seen in particular in the bottom plan view of the filter head 200 according to FIG. 9, through which the passage 120 passes into filter head 200.

Annular passage 121 which is defined by downcomer 104 extends around the tube 122.

The downcomer 104 extends further upward than the inner tube 122. Thus, the bypass 109 can be provided in the downcomer 104 above the inner tube 122.

Annular passage 114, in turn, extends around the downcomer 104 and is defined by the outer tube 123 which extends around the downcomer. This annular passage 114 serves as the second outlet of the filter candle 100.

The filter head 200 has a complementary design and comprises an inner annular passage 212 through which water flows into the downcomer 104, and an outer annular passage 213 through which water flows to the second outlet 203.

Figure 10:
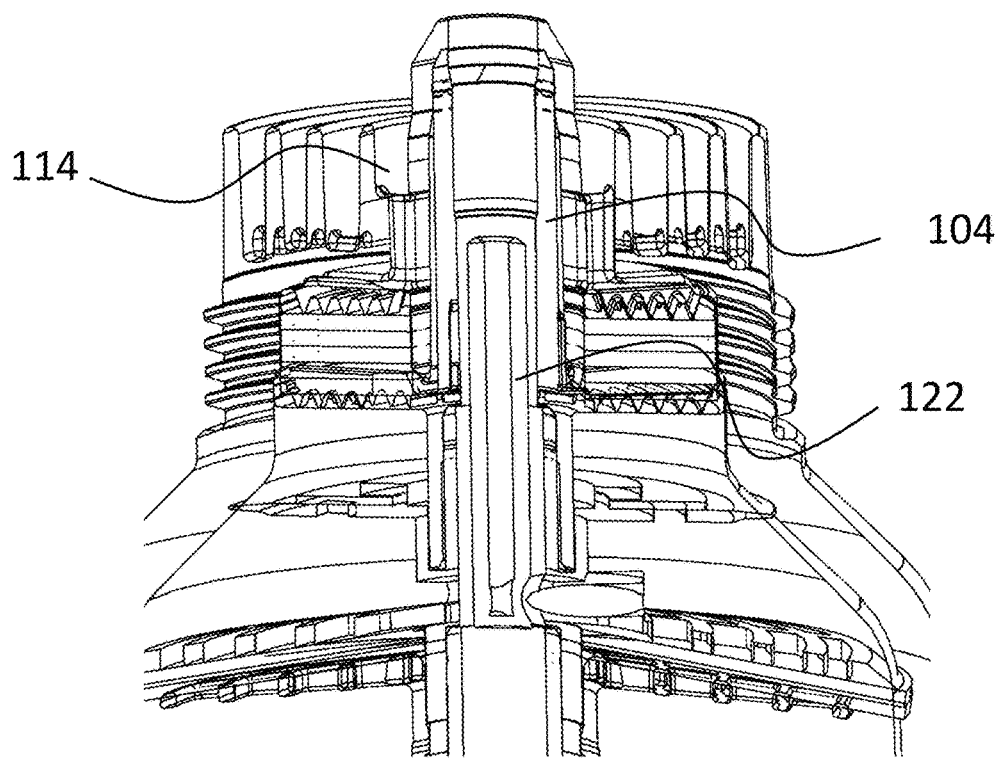
FIGS. 10 and 11 are longitudinal sectional views of the filter candle.

FIG. 10 is an axial sectional view of the head 102 of filter candle 100.

Tube 122 is accommodated inside and spaced apart from the downcomer 104, so that the actuator 207 of the filter head 200 can engage in the downcomer in the upper section of the downcomer 104.

The annular passage 114 of the second outlet extends around the downcomer 104.

Figure 11:
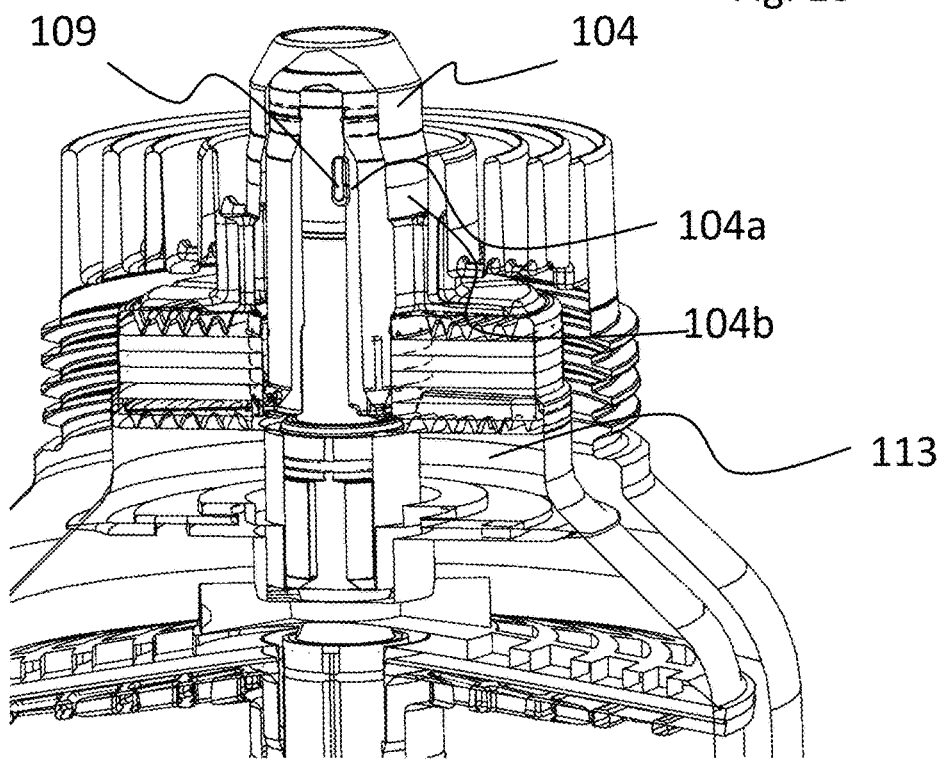

FIG. 11 is a sectional view with the sectional plane offset parallel to that of FIG. 10.

It can be seen that the downcomer 104 is double-walled at least in sections thereof. A gap is defined between the inner wall 104*a* and the outer wall 104*b* and defines a passage 110 (see FIG. 4) through which bypass water can flow from the opening 109 of inner wall 104*a* and into the mixing chamber 113.

The cross section of opening 109 can be varied through actuator 207.

Figure 12:
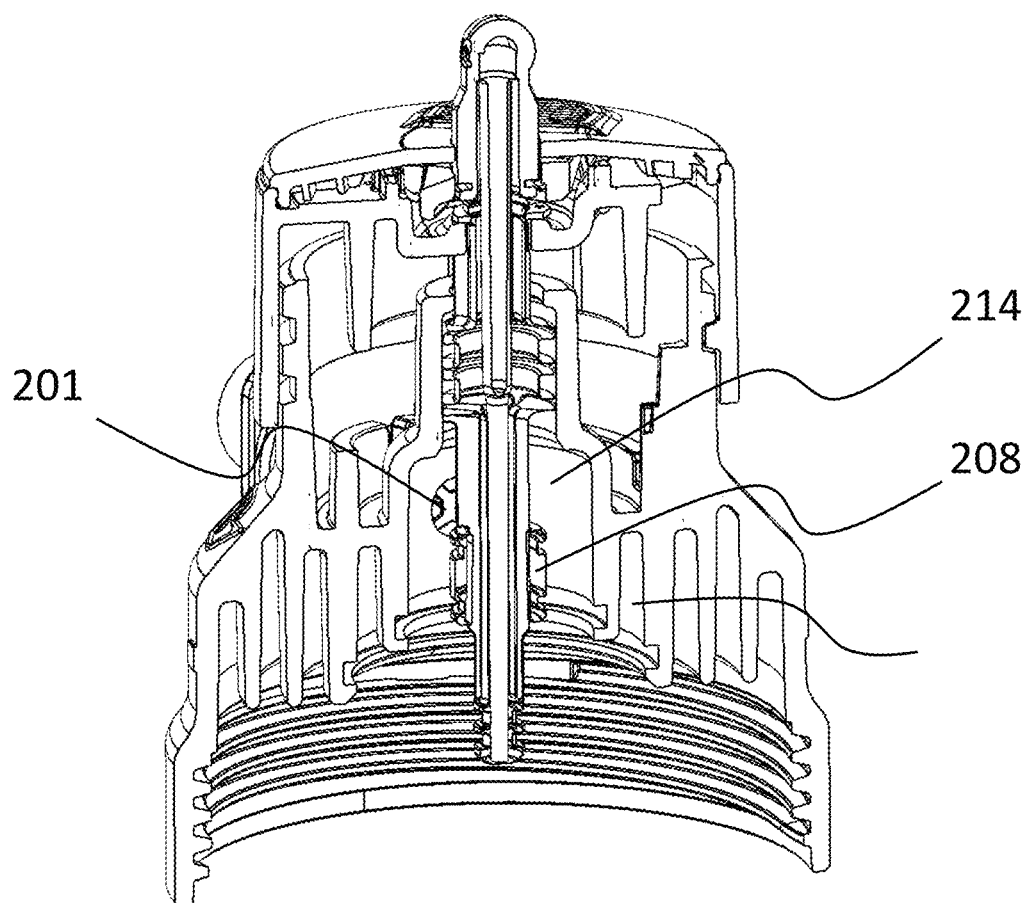
FIG. 12 is an axial sectional view of the filter head.
Figure 13:
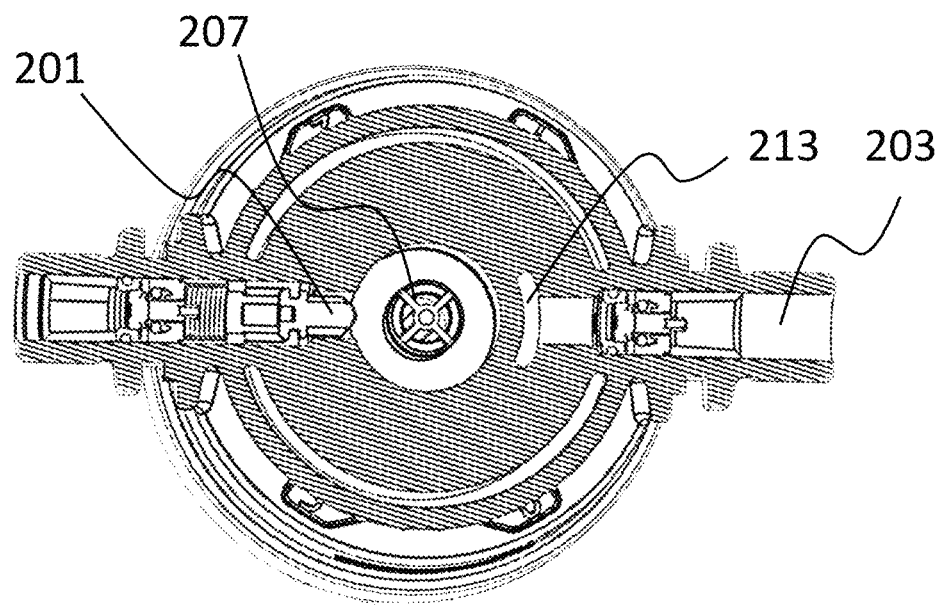
FIG. 13 is a cross sectional view taken close to the inlet of the filter head.

FIG. 12 is an axial sectional view and FIG. 13 is a cross-sectional view of the filter head 200 in the area of the inlet 201 and second outlet 203.

The inlet 201 leads into a seat 214 for the downcomer 104 which comprises the inlet 107 of the filter candle 100.

As shown in FIG. 13, the outer passage 213 of the head 200 leads to the second outlet 203.

The invention allowed to provide a compact system for water treatment, which comprises an outlet at which water is provided in particular for beverages, and in addition thereto a further outlet at which more strongly softened water can be extracted, which can be used for steam generating devices, for example.

LIST OF REFERENCE NUMERALS

1 Water treatment system
100 Filter candle
101 Housing
102 Head
103 Thread
104 Downcomer
104*a* Inner wall of downcomer
104*b* Outer wall of downcomer
105 Interior
106 Tube
107 Filter candle inlet
108 Lower inlet
109 Opening/bypass
110 Passage/annular passage
111 Passage outlet
112 Filter layer
113 Mixing chamber
114 Passage/annular passage
115 Backflow preventer
116 Plate
117 Cover
118 Filter layer
119 Inlet
120 Passage
121 Passage/annular passage
122 Tube
123 Outer tube
200 Filter head
201 Inlet
202 First outlet
203 Second outlet
204 Control element
205 Safety element
206 Thread
207 Actuator
208 Seal
209 Seal
210 Backflow preventer inlet
211 Backflow preventer second outlet
212 Annular passage
213 Annular passage/passage
214 Seat
215 Backflow preventer first outlet

The invention claimed is:

1. A system for water treatment, comprising:
a filter candle; and
a filter head in which the filter candle is installed,
wherein the filter candle is filled with an ion exchange material,
wherein the filter head has one inlet and at least two outlets,
wherein water passes through a filter layer of the filter candle before reaching the at least two outlets,
wherein water passes from the inlet along a first filter pathway to a first of the at least two outlets and passes along a second filter pathway to a second of the at least two outlets, and
wherein water that can be extracted at the first outlet after having passed through the first filter pathway is softened to a greater extent than water that can be extracted at the second outlet after having passed through the second filter pathway.

2. The system as claimed in claim 1,
wherein the filter layer is an activated carbon filter layer.

3. The system as claimed in claim 1,
wherein the system comprises a bypass which allows water that has passed through the ion exchange material in a dwell time to be mixed with water that has not passed through the ion exchange material or has passed through the ion exchange material in less than the dwell time.

4. The system as claimed in claim 3,
wherein the bypass is located in the filter head and/or in the filter candle.

5. The system as claimed in claim 4,
wherein the filter head comprises a control element which is operable to actuate an actuator which engages in the filter candle and through which a flow ratio between a main flow and a bypass flow can be adjusted.

6. The system as claimed in claim 1,
wherein the first outlet is aligned coaxially to a central axis of the filter head and/or is arranged so that it can be turned on the filter head.

7. A filter candle for treating water, adapted for being connected to
a filter head, the filter candle comprising
a housing that is filled with an ion exchange material for softening the water to be treated,
wherein the filter candle has a head with one inlet and at least two outlets,
wherein a first of the at least two outlets is connected to the inlet by a first filter pathway,
wherein a second of the at least two outlets is connected to the inlet by a second filter pathway
wherein water that can be introduced into the filter head at the first outlet after having passed through the first filter pathway is more softened than water that can be introduced into the filter head at the second outlet after having passed through the second filter pathway.

8. The filter candle of claim 7,
wherein the filter candle comprises a bypass which allows to mix water that has passed through the ion exchange material in a dwell time with water that has not passed through the ion exchange material or has passed therethrough in a time shorter than the dwell time.

9. The filter candle as claimed in claim 7,
wherein the water at the second outlet has not been softened but has passed through an activated carbon filter layer.

10. The filter candle as claimed in claim 8,
wherein the bypass can be adjusted by a control element on the filter head.

11. The filter candle as claimed in claim 7,
wherein the inlet and the outlets at the head of the filter candle are arranged coaxially.

12. The filter candle as claimed in claim 11,
wherein the inlet is arranged between the first and the second outlet.

13. The filter candle as claimed in claim 7,
wherein one or more backflow preventer(s) is/are arranged between a mixing chamber, where water that passed through the ion exchange material is mixed with a bypass flow, and the ion exchange material.

14. The filter candle as claimed in claim 8,
wherein bypass water passes through a filter layer.

15. The system as claimed in claim 1,
wherein one of the at least two outlets is arranged opposite the one inlet, and
wherein another one of the at least two outlets extends out of a top of the filter head, is angled, and configured to turn 360° for alignment with a tapping point.

16. The system as claimed in claim 1,
wherein water can be extract from the at least two outlets simultaneously.

17. The system as claimed in claim 1,
wherein the filter candle comprises a tube arranged in a center axis of the filter candle, the tube having a central axial passage that forms a central outlet of the filter candle,
wherein the tube sealingly receives a central one of the at least two outlets, and
wherein the tube opens through radial inlets into a cavity of the filter candle between a filter layer and a backflow preventer.

18. The system as claimed in claim 17,
wherein the filter candle comprises a candle inlet in fluid communication with the one inlet of the filter head,
wherein the candle inlet leads through an annular passage around the tube to a downcomer, and
wherein an adjustable bypass opening connects the annular passage through an annular bypass passage to a mixing chamber, and
wherein the mixing chamber is arranged downstream of the backflow preventer, and
wherein the mixing chamber is connected to a lateral one of the at least two outlets.

19. The system as claimed in claim 18,
further comprising an actuator configured to move up and down and thereby adjust an open cross section of the adjustable bypass opening,
wherein the central axial passage extends through the actuator.

\* \* \* \* \*